June 4, 1935.  D. STENHOUSE  2,004,017
GLASS FEEDING APPARATUS
Filed Aug. 5, 1932
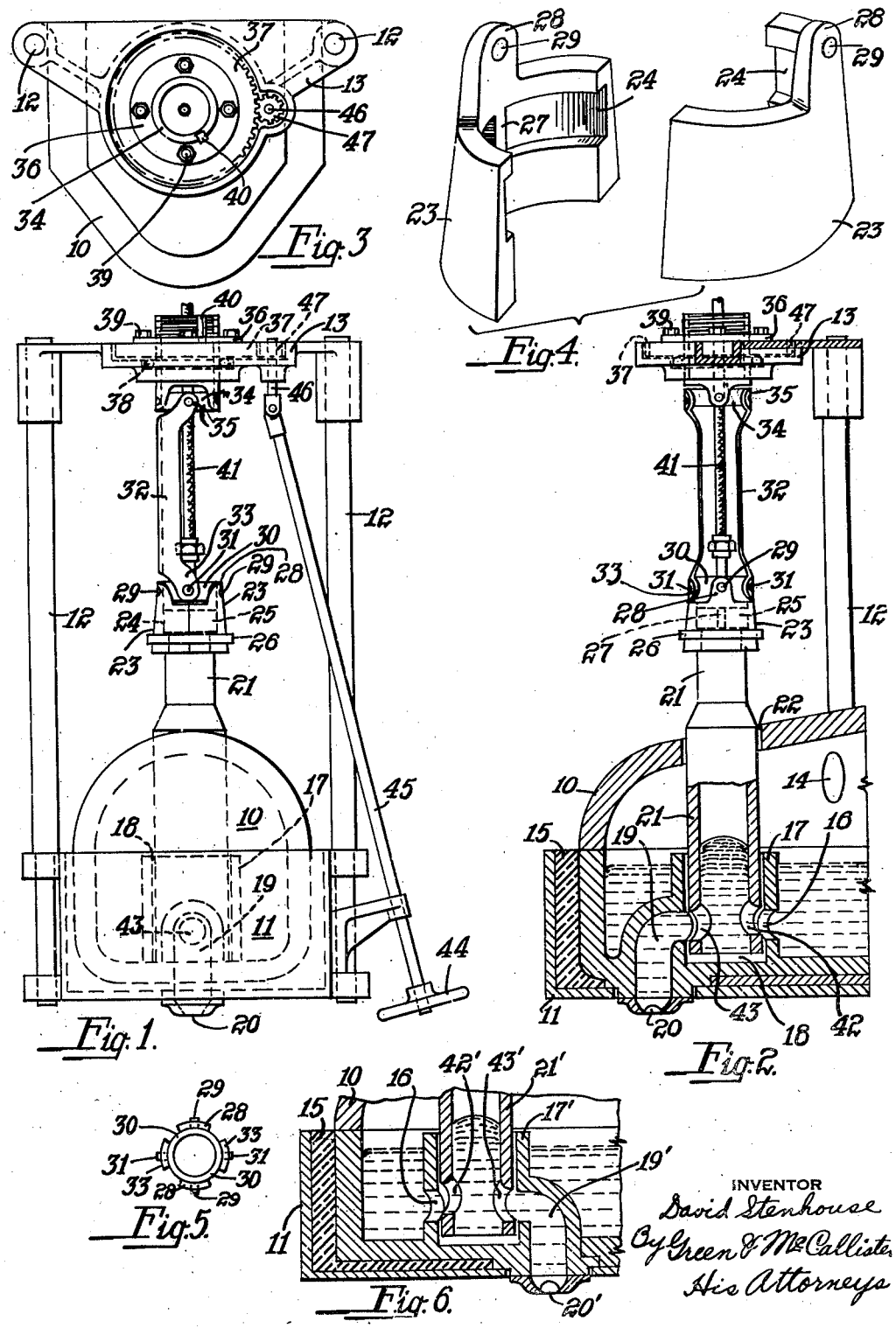

Patented June 4, 1935

2,004,017

UNITED STATES PATENT OFFICE 2,004,017

GLASS FEEDING APPARATUS

David Stenhouse, Washington, Pa., assignor to Hazel-Atlas Glass Company, Wheeling, W. Va., a corporation of West Virginia Application August 5, 1932, Serial No. 627,559

16 Claims. (Cl. 49—55)

This invention relates to apparatus for intermittently feeding charges of molten glass from a furnace or the like to molds or other shaping devices, and more particularly to improvements in apparatus for periodically interrupting the flow of glass to form suspended gobs or charges.

One object of the present invention is the provision of glass feeding apparatus having means for accurately controlling the size and weight of the gob or charge delivered to the shaping device.

Another object is to provide a glass feeder of the air-bell type having means for maintaining a constant level of glass within the air-bell.

A further object is to provide a glass feeding device of the air-bell type having means for maintaining the same proportional flow between the intake into the bell and the exhaust from the air-bell.

A still further object is to provide a glass feeding apparatus of the air-bell type having novel means for mounting the air-bell.

These and other objects which will be made readily apparent to those skilled in this particular art are accomplished by means of this invention, one embodiment of which is described in the following specification and illustrated in the accompanying drawing wherein:

Figure 1 is a view in front elevation of a glass furnace pot or forehearth equipped with my improved feeding device;

Fig. 2 is a view in longitudinal vertical section illustrating my improved feeding device;

Fig. 3 is a plan view of the forehearth and feeder;

Fig. 4 is an exploded view illustrating the mechanism for securing the air-bell to its supporting frame;

Fig. 5 is a detail view of a universal connection employed in supporting the air-bell; and Fig. 6 is a view in vertical section of the forehearth of a glass furnace illustrating a modification of my feeding device.

In the embodiment of my invention illustrated in the drawing, the objects are attained by flowing molten glass from a suitable melting furnace into a container or forehearth having an outlet or orifice in the bottom thereof through which the glass is discharged. The molten glass flowing through the container passes through a port in the side of a well extending upward from the bottom of the container and then through a passageway communicating with the outlet orifice.

To interrupt the flow of the glass through the well and to cause the glass to be periodically suspended in gobs from the orifice, I provide an air-bell which is so mounted that its lower end extends into the molten glass in the well. This air-bell which is alternately connected first to a source of vacuum to exhaust the air from the bell, and then to a source of air under pressure, has a pair of oppositely disposed ports in the wall thereof which partially register with the passageway leading to the outlet orifice and with the port in the well.

When the air-bell is connected to the vacuum, the air is exhausted from the air-bell and molten glass is drawn through the port in the well up into the air-bell and the flow of glass through the passageway leading to the orifice is stopped and the stub of glass projecting below the orifice is drawn up into the passageway into contact with the hotter glass therein. As soon as the required amount of glass has been drawn into the air-bell the vacuum is closed and the air-bell is connected to a source of air under pressure which forces the glass in the bell and causes a gob of glass to be suspended from the orifice. This gob of glass suspended from the discharge outlet is then severed and permitted to drop into the forming mold. As soon as the gob of glass has been severed, the air-bell is again connected to the source of suction and the above cycle is again repeated.

When the air-bell is connected to the source of air under pressure, the majority of the molten glass, instead of flowing back into the container through the registering ports in the bell and side of the well, passes through the aperture in the bell communicating with the passageway leading to the orifice. This is due to the fact that the glass will follow the line of least resistance, and since the pressure at the intake ports which is equal to atmospheric pressure plus the head of glass in the forehearth is materially greater than the pressure in the passageway leading to the outlet orifice which is substantially equal to atmospheric pressure, it follows that the majority of the glass will be exhausted through the orifice.

To control the size and weight of the gob suspended from the outlet orifice, the air-bell is so mounted that it is capable of being turned or rotated at any time to partially close or more fully open the intake and exhaust ports. By turning the air-bell, the inlet port in the bell is moved relative to the port in the well and the opening through which the glass flows to the interior of the bell may be the full size of the ports or less. At the same time, the size of the opening communicating with the passageway leading to the outlet orifice will be changed and the weight and size of the gob affected.

Since the size of the intake opening into the air-bell is always proportional to the outflow opening, it is apparent that a constant level of molten glass is always maintained in the air-bell. So that the proportion between the intake and outflow may be varied, the intake port in the bell is at a different height than the outflow port while the inlet port and outflow port in the member encircling the lower end of the bell are at the same level. Thus, by merely raising or lowering the air-bell relative to the cylindrical member, the inlet opening can be made smaller and the outlet opening larger or vice versa, so that the proportion between the two is changed, and by turning the bell, the size of the openings is varied without changing the proportion therebetween.

Other novel features of my invention reside in the assembly of the air-bell and in its mounting on the frame above the forehearth or pot.

Referring to the drawing in detail, 10 designates a pot or forehearth which is connected to a suitable glass melting furnace (not shown) and arranged at such a height on the furnace that the molten glass is permitted to flow into the forehearth or pot.

The pot 10 is supported in a metallic member 11 which is bolted to a melting tank (not shown). Extending upwardly from member 11 are rods 12, the tops of which are secured to a frame member 13 mounted on the furnace in any suitable manner.

To maintain the molten glass within the pot 10 at a constant temperature apertures 14 are formed in the walls of the pot through which the flames from suitable burners (not shown) are directed toward the nose of a forehearth and the space between the cover 11 and the pot 10 is filled with a suitable insulating material 15.

The glass as it flows into the container or pot 10, passes through a port 16 in the wall of a cylindrical member 17 the top of which extends slightly above the level of the glass in the container. The interior of the cylindrical member 17 forms a well 18 from which the molten glass flows, through passageway 19 to an outlet orifice 20 formed in a removable disc secured to the bottom of the pot 10 in any suitable manner. The glass leaving the orifice 20 drops into a mold or shaping device (not shown).

In order to interrupt the flow of molten glass and to suspend it in gobs from the orifice 20, a hollow member or air-bell 21 is provided which is alternately connected first to a source of vacuum and then to a source of air under pressure. This air-bell 21, which may be made of porcelain or any other suitable material, extends through an opening 22 in the top of the pot 10 and has its lower end disposed in the well 18 so that the glass flowing through the well is alternately drawn into and discharged from the bell as will more fully appear. The air-bell 21 is mounted in complementary semi-cylindrical clamping members 23 which have a groove or recess 24 on the inner surface thereof for receiving a flange 25 on the top of the air-bell 21.

The outer surfaces of the clamping members 23 taper from the top to the bottom and the members are readily clamped around the top of the air-bell by a ring member 26 which is forced over the tapered surfaces and wedges the two members together To prevent the air-bell from turning in the clamping members, a vertical slot is formed in the flange 25 which receives a projection 27 formed in the recess 24 of one of the members 23. Each of the clamping members 23 has an apertured lug 28 extending upwardly therefrom into which diametrically opposite pins 29 on ring 30 project. The ring 30 is suspended through diametrically opposite, outwardly extending pins 31 from the lower end of a member 32 having apertured ears 33 for receiving the pins 31.

The upper end of the member 32 is suspended from a member 34, through a ring 35, in exactly the same manner that the clamping members 23 are suspended from the lower end of the member 32. The member 34 is cylindrical in shape and has a nut 36 threaded over its outer surface for supporting it on a gear 37 turnably mounted on a ball race 38 in the frame 13. The nut 36 is secured to the gear 37 by bolts 39, and movement of the member 34 within the nut 36 is normally prevented by a key 40.

The rings 30 and 35 form universal joints between the member 34 and the air bell 21, and maintain it in proper position in the well 18 at all times.

From the foregoing description it is readily apparent that the air-bell may be readily changed by merely removing the ring 26, so that the clamping members 23 can be withdrawn from the pins 29. After the clamping members have been removed, the member 32 is swung to one side through the universal connection with the member 34 and the bell can then be lifted out of the pot.

In order to alternately draw the molten glass into and discharge it from the air-bell 21, so that it will be periodically suspended from the orifice in gobs the air-bell 21 has a flexible tube 41 or hose connected thereto which connects the interior of the bell, through a suitable two-way valve (not shown), with first a source of vacuum and then to a suitable source of air under pressure.

When the air-bell is connected to the vacuum the air is exhausted from the interior of the bell and molten glass is drawn into the bell through the port 16 and a port 42 formed in the wall of the bell adjacent the port 16. These ports form an opening for establishing communication between the interior of the bell and the container. At the same time the glass is being drawn through the ports 16 and 42 into the interior of the bell, the flow of glass in the passageway 19 is arrested due to the pull of the vacuum through a port 43 on the glass in the passageway.

As soon as the flow of glass through the orifice 20 has been arrested for a sufficient length of time to permit a mold to be positioned below the orifice, the two-way valve is turned closing the vacuum and connecting the interior of the bell to the source of air under pressure. This air forces the glass in the bell through the port 43 and passageway 19 and out the orifice 20 where it is suspended over a mold. This gob of glass is then severed by suitable shears (not shown) and falls into the forming mold.

As soon as the glass has been severed the two-way valve is again operated and the source of compressed air is shut off and the interior of the bell is again connected to the vacuum. This vacuum is of sufficient strength to slightly retract the severed stub of glass and withdraw it from contact with the shears.

So that the weight and size of the gob suspended from the orifice 20 may be readily controlled, the gear 37 supporting the air-bell 21 is turned moving the ports 42 and 43 relative to the port 16 and the passageway 19, thereby changing the size of the inlet and outflow opening between the air-bell and the cylindrical member 17. To turn the air-bell 21, I provide a handwheel 44 which is secured to a rod 45 connected to a shaft 46 having a pinion 47 secured thereto, which meshes with the gear 37.

From this arrangement it is apparent that by turning the handwheel 44, the air-bell 21 is turned about its longitudinal axis and the size of the intake opening formed by the ports 16 and 42 may be regulated as desired, and at the same time that the inlet opening is being regulated, the outlet opening is being regulated in proportion thereto since the port 43 in the air-bell is opposite the port 42.

Such arrangement of the openings in the air-bell creates a differential between the inlet and outflow openings and causes the outflow of glass from the interior of the air-bell to always be proportional to the flow of glass into the air-bell through the inlet opening, and since this outflow is always proportional to the inflow, it is apparent that the level of the glass within the air-bell will remain substantially constant. In order that the proportion between the intake opening and the outflow opening may be changed, the ports in the air-bell are arranged at different heights from the bottom of the air-bell. For example, in Fig. 2 of the drawing, I have shown the port 42 as being higher than the port 43, while the port 16 and the entrance of the passageway 19 are at the same level.

As illustrated, if the air-bell be lowered, it is apparent that the inlet opening would be made larger since the port 42 would fully register with the port 16 in the cylindrical member 17, while the outlet opening would be made smaller since the entrance of the passageway 19 would be partially closed by the air-bell 21. To effect such a change in proportion between the intake opening and the outlet opening, it is only necessary to remove the key 40 and the bolts 39 and turn the nut 36 to raise or lower the air-bell relative to the bottom of the well.

In Fig. 6, I have illustrated a modification of my feeder in which the pot 10 is provided with an upstanding cylindrical member 17' having a passageway 19' leading therefrom to an orifice 20' formed in the bottom of the pot, between the melting furnace and the cylindrical member. In this modification the molten glass flows from the furnace to the nose of the pot and then through a port 16' into the well 18'. The flow of glass through the well is interrupted by an air-bell 21' having ports 42' and 43' in the walls thereof which partially register with the port 16' and the passageway 19', respectively. The air-bell is mounted and operated in substantially the same manner as previously described. With this construction it is possible to maintain a more uniform temperature in the glass since the glass is always in circulation and flows naturally from the furnace into the well in the air-bell.

From the foregoing description it is apparent that I have designed a feeder of the air-bell type for periodically delivering a gob of molten glass to a forming machine which is simple and positive in operation and a succession of gobs of any desired size and weight may be readily formed.

With my improved feeder the level of the glass in the air-bell remains substantially constant, thereby insuring the delivery of gobs of the same size and weight. This maintaining a constant level of glass in the air-bell prevents the air-line from becoming clogged with too much glass and also prevents the seal from being broken, as is common in the feeders of this type now in use, when the level of the glass is too low to keep the air pressure from breaking through.

While I have described one embodiment of my invention, it is apparent that certain modifications may be made therein without departing from the spirit of my invention or the scope of the appended claims.

What I claim as new and desire to secure by Letters Patent is:

1. A glass feeding mechanism comprising in combination a glass container, an air-bell extending into the molten glass in said container, a member in said container surrounding the lower end of said air-bell and having a port and passageway opposite said port and leading to the bottom of said container, said bell having ports therein simultaneously registering with the port and passageway in said encircling member, means for rotatably adjusting said bell to change the position of the ports therein relative to the ports in said member, and means for creating alternate suction and pressure within said bell to draw glass through the intake port and expel it through said passageway.

2. The combination with a molten glass container having a discharge orifice at its bottom, of an air-bell extending into the molten glass in said container and having oppositely disposed ports formed at different levels in the wall thereof, said parts maintaining a proportional flow of glass into and out of said bell, whereby a predetermined charge of glass will be delivered to said orifice, and means rotatably adjusting said air-bell to regulate and accurately control the size of the delivered gob.

3. The combination with a container for molten glass having a discharge orifice therein, of a hollow member having oppositely disposed ports at different heights projecting into the glass within said container, means for alternately connecting said hollow member to negative and positive pressure, a member surrounding said hollow member and having a passageway therein connected with said orifice and a port registering with one of the ports in said hollow member, and means for rotatably adjusting said hollow member to control the flow of glass into said hollow member.

4. A glass feeding device comprising a container for molten glass having an outlet in the bottom thereof, a cylindrical member disposed in said container having a passageway therein for establishing communication between the said orifice and the interior of said member, a member projecting into said cylindrical member having a pair of ports therein one of which communicates with said passageway, and the other with an aperture formed in the side of said cylindrical member, means for alternately drawing molten glass into said member and discharging it in suspended gobs through said orifice, and means for adjusting said member to accurately control the size of the suspended gob.

5. Apparatus for delivering mold charges comprising a molten glass container having an outlet orifice in the bottom, a member projecting upwardly from the bottom of said container surrounding said orifice and having a port therein for permitting the molten glass to flow into said member and out through the orifice, said port and said orifice being in constant communication, means extending into said member for periodically drawing glass from said container and forcing it through said outlet, and means for maintaining a constant proportion between the outflow and intake of said means.

6. Apparatus for delivering suspended mold charges, comprising a pot having an outlet orifice in the bottom thereof, a member extending above the level of the molten glass surrounding the orifice and having a port therein, means for causing the molten glass to periodically flow through said port and out said orifice, said port and said orifice being in constant communication, means for maintaining the outflow proportional to the inflow through said port, and means for regulating the weight of glass delivered through the orifice.

7. The combination with a container for molten glass having an outlet orifice, of a cylindrical member disposed in said container and having an inlet port and an outflow passage connecting it with the orifice, an air-bell extending into the cylindrical member and having ports in the wall thereof, communicating with the inlet port and the outflow passage in said member, the ports in said air-bell being at different elevations, means for turning said air-bell to vary the size of the inlet and outflow openings, and means for raising and lowering said air-bell to vary the proportion between the intake and outflow openings.

8. A glass feeder including a flow spout having a flow orifice, a hollow member controlling the flow of glass through said orifice, means cooperating with said hollow member for controlling the flow of glass to said hollow member, and means cooperating with said hollow member for controlling the flow of glass from said hollow member to said orifice, said hollow member being constantly in communication with the glass in the flow spout and the glass in the orifice.

9. A glass feeder including a flow spout having a flow orifice, an air-bell controlling the flow of glass through the orifice, the air pressure within the bell being periodically increased and decreased, means cooperating with the air-bell for controlling the flow of glass to the air-bell, and means co-operating with the air-bell for controlling the flow of glass from the air-bell to the flow orifice, said air-bell being constantly in communication with the glass in the flow spout and the glass in the orifice.

10. A glass feeder including a flow spout having a flow orifice, a cylindrical member controlling the flow of glass through said orifice, means cooperating with the cylindrical member for controlling the volume of glass flowing to and from the cylindrical member, and means for varying the volume flow without varying the proportion between in-flow and out-flow.

11. A glass feeder including a flow spout having a flow orifice, a hollow member controlling the flow of glass through said orifice, means cooperating with the hollow member for controlling the volume of glass flowing to the hollow member, means cooperating with the hollow member for controlling the flow of glass from the hollow member to said orifice, and means for simultaneously varying the in-flow and out-flow.

12. A glass feeder including a flow spout having a flow orifice, a member controlling the flow of glass through said orifice, means cooperating with said member for controlling the volume of glass flowing to and from the member, and means for varying the proportion between the in-flow and the out-flow.

13. A glass feeder including a flow spout having a flow orifice, a member controlling the flow of glass through said orifice, means cooperating with said member for controlling the volume of glass flowing to and from the member, and means for simultaneously adjusting the in-flow and out-flow to vary the proportion between the in-flow and out-flow.

14. A glass feeder including a flow spout having a flow orifice, a member controlling the flow of glass through said orifice, means cooperating with said member for controlling the flow of glass to and from said member, said member being rotatably adjustable to vary the volume of in-flow and out-flow without varying the proportion between in-flow and out-flow, and means for varying the proportion between in-flow and out-flow.

15. A glass feeder including a flow spout having a flow orifice, a member controlling the flow of glass through said orifice, means cooperating with said member for controlling the flow of glass to and from said member, means for varying the volume of in-flow and out-flow without varying the proportion between in-flow and out-flow, said member being vertically adjustable to vary the proportion between the in-flow and the out-flow.

16. A glass feeder including a flow spout having a flow orifice, a member controlling the flow of glass through said orifice, said member being rotatably adjustable to vary the volume of glass flowing to and from said member without varying the proportion between the in-flow and out-flow, and said member being vertically adjustable to vary the proportion between in-flow and out-flow.

DAVID STENHOUSE.